US005238222A

United States Patent [19]

Sumida et al.

[11] Patent Number: 5,238,222

[45] Date of Patent: Aug. 24, 1993

[54] FLOW CONTROL VALVE

[75] Inventors: Mamoru Sumida; Manabu Miyaki; Masayasu Miyajima, all of Himeji, Japan

[73] Assignee: Mitsubishi Denki K.K., Tokyo, Japan

[21] Appl. No.: 910,807

[22] Filed: Jul. 9, 1992

[30] Foreign Application Priority Data

Aug. 28, 1991 [JP] Japan .................................. 3-217029

[51] Int. Cl.[5] ........................ F16K 31/06; F16K 47/08

[52] U.S. Cl. ................................ 251/118; 251/129.15

[58] Field of Search ..................... 251/118, 127, 129.15

[56] References Cited

U.S. PATENT DOCUMENTS 3,476,128 11/1969 Barker ............................ 251/118 X
3,729,025 4/1973 Silvestrini ....................... 251/118 X
4,651,971 3/1987 Donahue, Jr. .................. 251/118 X
4,887,769 12/1989 Okamoto et al. ............... 251/127 X

FOREIGN PATENT DOCUMENTS 243582 10/1988 Japan .
88076 7/1990 Japan .

*Primary Examiner*—Arnold Rosenthal
*Attorney, Agent, or Firm*—Sughrue, Mion, Zinn, Macpeak & Seas

[57] ABSTRACT

A flow control valve comprises a fixed iron core, an electromagnetic coil, a casing made of a magnetic substance in which the electromagnetic coil is received, a movable iron core, a return spring for urging the movable iron core in the opposite direction to an attractive force, a flow control valve main body provided with a fluid inlet passage and a fluid outlet passage, a valve provided at the movable iron core, and a valve seat with which the valve is in contact in a non-electric conductive state, wherein at least one of the fluid inlet and outlet passages of the fluid control valve main body is formed to restrict the maximum flow rate of the flow control valve.

4 Claims, 3 Drawing Sheets

FLOW CONTROL VALVE

BACKGROUND OF THE INVENTION

1. Field of the Invention

The present invention relates to a valve for controlling a flow rate of fluid. More particularly, it relates to a flow control valve for controlling a flow rate of air sucked into an automobile engine.

2. Discussion of Background

There have been known flow control valves for an electronically controlled fuel injection type engine in which a by-pass passage is formed near a throttle valve in an air intake pipe to regulate a flow rate of air sucked into the engine by opening or closing the by-pass passage. For instance, a proportional type flow control valve is used to open and close the by-pass passage. There are several kinds of practically used proportion type flow control valves in which a linear solenoid or a stepper motor is used as a driving source. For the structure of the valve, there are classified a spool type, a poppet type and a rotary type. In this specification, description will be made as to a type of using a linear solenoid as a driving source.

FIG. 2 shows a cross-sectional view of a proportion type flow control valve which belongs the above mentioned linear solenoid type. In FIG. 2, reference numeral 1 designates a solenoid device in which a fixed iron core 2 is provided at the center of the inside of it in the longitudinal direction. A cylinder-like casing is disposed at the inner circumference of the solenoid device 1. A movable iron core 4 is disposed at a position facing the fixed iron core 2. A return spring 5 is interposed between the fixed iron core and the movable iron core 4.

The movable iron core 4 has a reduced diameter portion 4*c*, and a valve 14 is slidably fitted to the reduced diameter portion 4*c*. At the outer circumference of the reduced diameter portion 4*c*, a spring 15 is provided so as to urge the valve 14 in the front end side of it (on the left hand of the drawing). A holder 16 which restricts the movement of the valve 14 toward the front end side is fixed to the front end of the reduced diameter portion 4*c*. The valve 14 is relatively urged toward the movable iron core 4 by means of the spring 15 so that the valve 14 is brought to contact with the holder 16. Thus, a valve assembly 18 is constituted by the movable iron core 4, the valve 14, the spring 15 and the holder 16.

An electromagnetic coil 6 is disposed at the inner circumferential surface of the casing 3 through an insulating material 3*a*. A pipe 7 is disposed at the inner circumferential surface of a bobbin 6*a* on which the electromagnetic coil 6 is wound. The fixed iron core 2 and the movable iron core 4 are disposed facing each other inside the pipe 7. The above-mentioned return spring 5 is extended in the space between the fixed iron core 2 and the movable iron core 4 through a spring holder 5*a*, whereby the movable iron core 4 is pushed by the return spring 5 in the direction against an electromagnetic attractive force by the electromagnetic coil 6. Thus, the return spring 5 always exerts a force on the movable iron core 4 in the left-hand direction in FIG. 2. A lead wire 6*b* is connected to the electromagnetic coil 6.

A spring 8 is disposed at a position opposite the return spring 5 with respect to the movable iron core 4. The spring 8 is disposed between the spring holder 9 and the holder 16 which is fixed to the front end of the reduced diameter portion 4*c* of the movable iron core 4. The spring holder 9 is fixed to the front end of an adjusting screw 10 which is engaged with a proportion type flow control valve main body 11.

A fluid inlet passage 11*a* is formed in the vicinity of an end portion of the solenoid device side of the proportion type flow control valve main body 11. A fluid outlet passage 11*c* is formed at the opposite side (in the left end portion in FIG. 2) of the main body 11.

The proportion type flow control valve main body 11 is fitted to a ribbed guiding portion 19*a* formed in a guide member 19 which is in turn fitted to the end portion of the solenoid device 11 so that the solenoid device 1 and the proportion type flow control valve main body 11 are fixed to each other without looseness. The guide member 19 holds an end portion of the pipe 7 which supports the movable iron core 4 so as to be freely slidable. A valve seat 13 is fitted to the proportion type flow control valve main body 11 at a position facing the valve assembly 18, whereby a space 11*b* communicating with the fluid outlet passage 11*c* is separated from the fluid inlet passage 11*a*.

The adjusting screw 10 is engaged with the proportion type flow control valve main body 11 at a position near which the fluid outlet passage 11*c* is formed to extend toward the movable iron core 4. The spring 8, which is supported by the spring holder 9 fixed to the adjusting screw 10 always urges the movable iron core 4 in the same direction as the electromagnetic attractive force.

The valve assembly 18 receives the urging forces of the spring 8 and the return spring 5 so that the movable iron core 4 is brought to contact with the valve seat 13 in which there is a slight gap between the pipe 7 and the movable iron core 4 and there may occur a slight inclination of the movable iron core in the gap.

Since the spring 8 is disposed between the holder 16 and the spring holder 9, the spring force of the spring 8 can be adjusted by the adjusting screw 10 so that the urging force of the valve assembly 18 to the valve seat 13 can be adjusted. A contacting load by the valve 14 to the valve seat 13 is so determined that it is smaller than the contacting load between the valve 14 and the holder 16 by the spring 15 and there is no gap between the valve 14 and the holder 16 in an entirely closing state.

The contacting surface of the valve seat 13 is formed to have a tapered shape (a conical form). On the other hand, the contacting surface of the valve 14 is in a spherical form. The diameter of the circle formed by the contact of the contacting surface of the valve seat 13 to the contacting surface of the valve 14 is, for instance, 11 mm, the diameter being determined so as to be substantially agree with the inner diameter of the pipe 7 in which the movable iron core 4 is slidably moved.

The valve seat 13 and the valve 14 may be composed of polybutylene terephthalate (PBT).

A communicating hole 4*b* is formed in the axial center portion of the movable iron core 4 so that a pressure in the space 11*b* which communicates with the fluid outlet passage 11*c* is balanced with a pressure in a space formed between the movable iron core 4 and the fixed iron core 2. The diameter of the communicating hole 4*b* is determined to be 3 mm or more.

In the proportion type flow control valve having the construction described above, when an electric current is supplied to the electromagnetic coil 6, the movable iron core 4 is attracted to the fixed iron core 2 against the pushing force of the return spring 5, whereby the valve assembly 18 is moved to open the valve. In a case that the proportion type flow control valve is used to control a flow rate by using a duty control or a dither control, a repulsive force which takes place due to the separation of the valve from the valve seat owing to slight vibrations in the valve assembly 18 or a shock at the time of contacting the valve to the valve seat, which is derived from the duty control or the dither control, can be absorbed by the spring 15 which urges the valve 14.

In the above-mentioned case, the solenoid device 1 and the proportion type flow control valve body 11 are fitted to each other without looseness through the guide member 19, deviation of the contacting portions of the valve assembly 18 and the valve seat 13 takes place only by the inclination of the valve assembly 18, which is resulted from the gap between the outer circumference of the movable iron core 4 and the inner circumference of the pipe 7. Further, since the contacting surface of the valve seat 13 is in a tapered form and the contacting surface of the valve 14 is in a spherical form as described above, a circle having a predetermined diameter can be formed even though there is a slight inclination, whereby an excellent sealing function is assured. For instance, the gap of the pipe 7 and the movable iron core 4 which slides in the pipe 7 is in a range of 0.02 mm- 0.2 mm, and the ratio L/D of the length of sliding L to the diameter of sliding portion D is 1.5 or more.

Further, in the above-mentioned case, since the circle of contact of the valve 14 to the valve seat 13 substantially agrees with the sliding diameter between the movable iron core 4 and the pipe 7, the forces applied to the valve assembly 18 from the both sides are balanced by means of the communicating hole 4*b* even a negative pressure of the intake air pipe is applied to the fluid outlet passage 11*c* in a non-electric conductive state, whereby a stable condition can be maintained.

In a fluid control valve having a spool type valve or a rotary type valve, flow rate is controlled by controlling the surface area of air passage in the sliding portion. Accordingly, an amount of air leaking from the gap at the sliding portion can not be zero even when the valve is moved to the position at which the surface area of the air passage is entirely closed by turning-off the power source. The amount of leaking air can be reduced by minimizing the gap in the sliding portion. However, an allowable range of gap will be determined when it is considered that a smooth sliding movement has to be maintained and there may be deposition of oil or carbon and the scattering of the initial dimensions. Accordingly, although the spool type valve or the rotary type valve has an advantage that the flow rate can be changed in proportion to the stroke or an angle of rotation of the valve, they are disadvantageous in a case that the reduction of the amount of leaking air at the OFF time is considered to be most important.

In controlling a flow rate of by-passed air in an internal combustion engine, it is desirable to save fuel by reducing a flow rate of leaking air from the by-pass passage to zero to thereby reduce the revolution speed of the engine if it is unnecessary to flow the by-passed air in an idling state. In particular, since the absolute value of the flow rate of air necessary for the idling operation itself is small in a car having a small displacement, there is a possibility that the idling revolution of the engine can be maintained by only the flow rate of leaking air from the throttle valve side. In such case, it is preferably to improve the fuel consumption rate by reducing the flow rate of leaking air from the by-pass passage so as not to unnecessarily increase the idling speed of the engine.

Such improvement is most desirable in view of a relation of a grade of automobile to a fuel consumption rate.

From the reasons as described above, it is considered to be desirable to constitute a poppet type valve in order to reduce a flow rate of leaking air. In the proportion type flow control valve of this kinds including the pool type, the rotary type and the poppet type, there have been generally used a duty control wherein a current is supplied intermittently to the electromagnetic coil at a predetermined frequency and the ratio of an ON time and an OFF time is changed to thereby cause slight sliding movements of the movable iron core, or a dither control wherein variation (an Ac component) is given to a constant current value (a Dc component) to thereby cause slight sliding movements of the movable iron core, in order to reduce hysteresis due to a frictional resistance in the sliding movement section or to reduce hysteresis in the elastic repulsive force of the elastic member which is subjected to expanding and shrinking functions by the movable member.

Further, as methods for restricting the maximum flow rate of the valve, there have been used a method wherein the stroke of the movable iron core is mechanically controlled, a method wherein an attractive force and a spring force by the inner spring are balanced while the attractive force is saturated, and a method wherein an element to restrict the surface area of air passage is disposed in the flow rate controlling section. Generally, in consideration of reduction of an attractive force which is resulted by heat in the solenoid, the maximum flow rate is determined under the condition of about 80% of the maximum current.

In the above-mentioned conventional maximum flow rate controlling methods, there were disadvantages as follows. The method of mechanically controlling the stroke of the movable iron core had such disadvantages of occurrence of striking sounds and poor durability. The method of balancing the attractive force and the return spring force had such disadvantage that scattering of the maximum flow rate was unavoidable because of scattering of the attractive force, scattering of the load of the return spring and scattering of the valve position after assembling which is caused by the scattering of the dimensions of the structural elements. Further, the shapes of the structural elements which constitute a magnetic circuit have to be special in order to obtain such attractive characteristics, which pushed up manufacturing cost (Japanese Unexamined Patent Publication No. 88076/1990). Furthermore, in cases that a cylindrical portion 16*a* is formed in the holder 16 as shown in FIG. 3 and a structural element to control the surface area of passage such as a valve seat 13 having a cylindrical portion 13*a* is disposed in the flow control section as shown in FIG. 4, there may increase the number of structural elements to thereby increase manufacturing cost and decrease the processability in assembling the flow control valve.

SUMMARY OF THE INVENTION

It is an object of the present invention to provide a flow control valve which eliminates occurrence of striking sounds at the time of the operation of the valve, the scattering of the maximum flow rate, and is capable of controlling the maximum flow rate while the number of the structural elements is reduced.

The foregoing and other objects of the present invention have been attained by providing a flow control valve which comprises a fixed iron core, an electromagnetic coil, a casing made of a magnetic substance in which the electromagnetic coil is received, a movable iron core to be attracted to the fixed iron core, a return spring for urging the movable iron core in the opposite direction to an attractive force, a flow control valve main body provided with a fluid inlet passage and a fluid outlet passage, a valve provided at the movable iron core, and a valve seat with which the valve is in contact in a non-electric conductive state, wherein at least one of the fluid inlet and outlet passages of the fluid control valve main body is formed to restrict the maximum flow rate of the flow control valve.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF DRAWINGS

Figure 1:
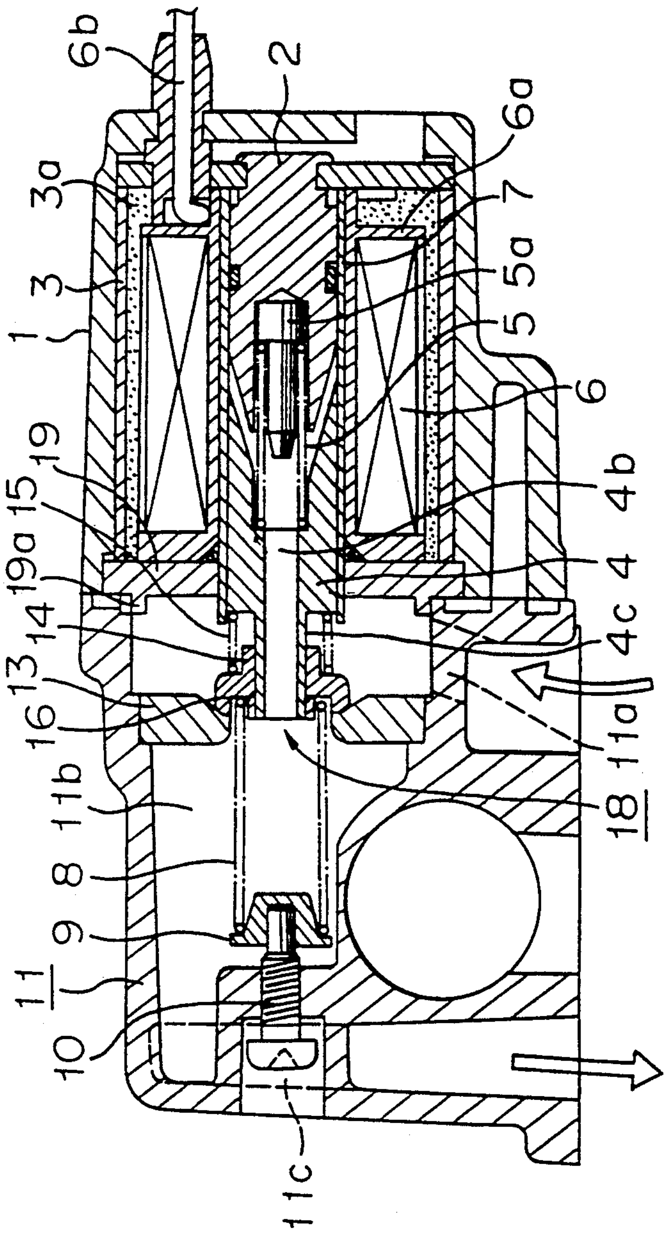
FIG. 1 is a cross-sectional view of an embodiment of the flow control valve according to the present invention.

Referring to the drawings wherein the same reference numerals designate the same or corresponding parts, there is shown an example of the flow control valve according to the present invention.

Figure 2:
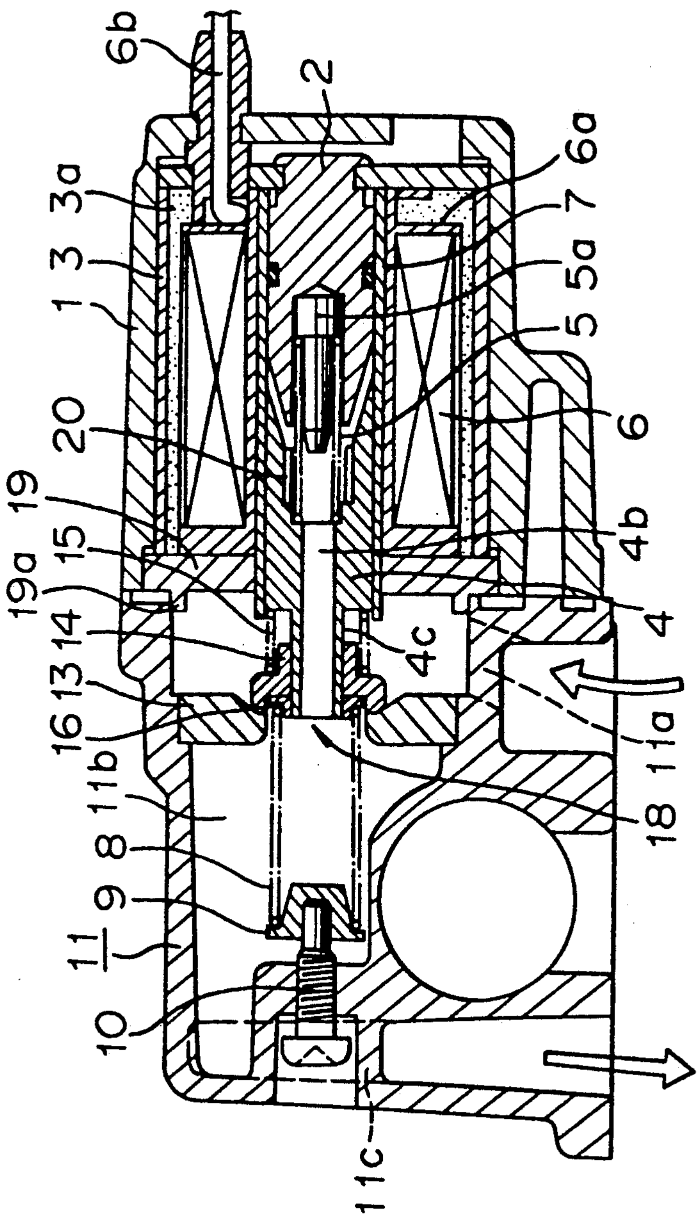
FIGURE 2 PRIOR ART
FIG. 2 is a cross-sectional view showing a conventional flow control valve.
Figure 3:
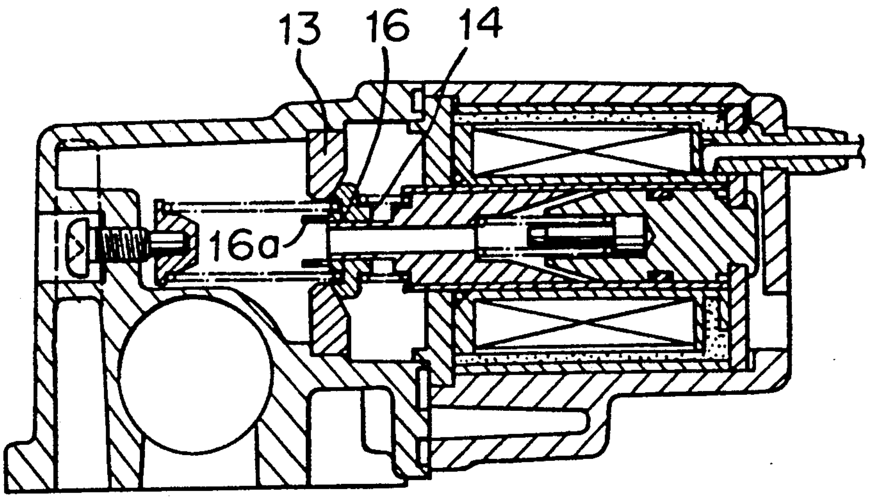
FIGURE 3 PRIOR ART
FIG. 3 is a cross-sectional view showing another conventional flow control valve.
Figure 4:
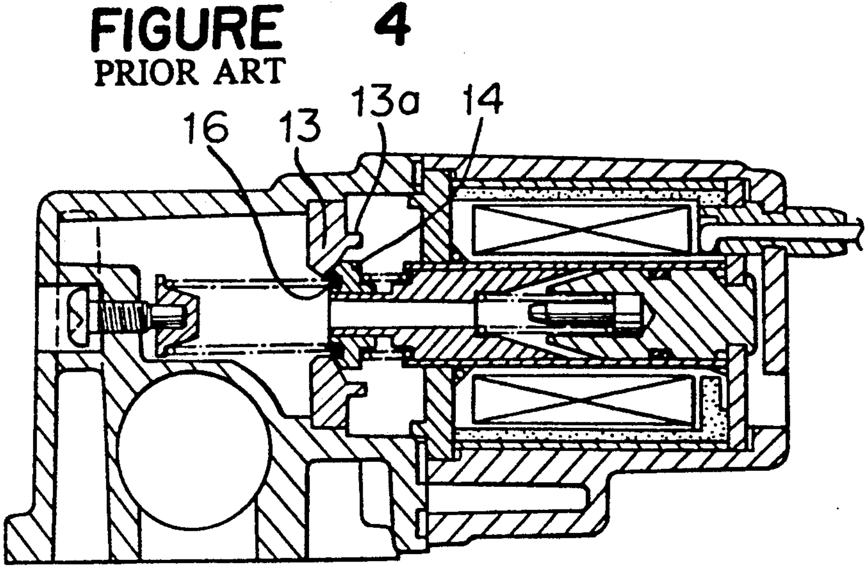
FIGURE 4 PRIOR ART
FIG. 4 is a cross-sectional view showing another conventional flow control valve.

In FIG. 1, the construction of the flow control valve of the present invention is the same as the conventional flow control valve as shown in FIG. 2 except that the surface area of the fluid inlet passage 11*a* or the surface area of the fluid outlet passage 11*c* are determined to have a predetermined value whereby the maximum flow rate can be restricted. Namely, even when the movable iron core 4 is moved over a predetermined stroke (in the right hand direction in FIG. 1) so that the surface area of the passage which is formed between the valve 14 and the valve seat 13 becomes higher than the value which corresponds to a predetermined maximum flow rate, the maximum flow rate can be restricted because the surface area of the passage can be restricted to have a predetermined value by means of the fluid inlet passage 11*a* or the fluid outlet passage 11*c*.

Generally, in a flow control valve, the air flow rate Q can be obtained with use of hydrodynamics when the magnitude of the orifice of the valve and the pressure difference between the inlet and outlet of the orifice are determined. The value of the air flow rate Q is subjected to correction by using a flow coefficient k which is determined in consideration of the shape of the passage of the valve, and other coefficient to thereby obtain a surface area corresponding to the corrected air flow rate. For instance, in a flow control valve designed to have the maximum air flow rate of 6 l/s, under a pressure difference of 500 mmHg, a surface area of passage of about 50 $mm^2$ is needed. Usually, the surface area which is formed at the inner diameter portion of the valve seat is in a range of about 90 $mm^2$–100 $mm^2$ when the shapes and dimensions of the structural elements are taken into account. Accordingly, the restriction of the surface area of passage is required at any portion unless the restriction by adjusting the stroke is conducted.

In the present invention, since the proportion type flow control valve main body 11 is formed by aluminum-diecasting, it is possible to precisely form the dimensions of the fluid inlet passage 11*b* and the fluid outlet passage 11*c* by using of a metal mold for diecasting, and accordingly, it is unnecessary to carry out machine-finishing. It is clear that the way of restricting the maximum flow rate is applicable to not only the proportion type flow control valve as shown in FIG. 1 but also a widely used poppet type flow control valve. When the construction according to the present invention is used for, for instance, a valve for switching ON-OFF operations or a duty solenoid valve, it is possible to carry out a conventional flow control unnecessitating a stopper at the full-open side, (the maximum flow rate).

Further, description has been made as to the flow control valve wherein the openings of the fluid inlet and outlet passages are formed at the fitting surface of the flow control valve main body as shown in FIG. 1. However, the same effect is obtainable even in a case that nipples are connected to the openings of the fluid inlet and outlet passages 11*a*, 11*c* wherein rubber hoses are respectively connected to the nipples.

As described above, in accordance with the flow control valve of the present invention, since at least one of the surface area of the fluid inlet and outlet passages of the flow control valve main body is determined to restrict the maximum rate of the flow control valve, it is possible to eliminate striking sounds, the scattering of the maximum flow rate and the increase of the number of the structural elements, which are disadvantages in the conventional control valve. Further, the maximum flow rate can be precisely controlled without increasing manufacturing steps.

Obviously, numerous modifications and variations of the present invention are possible in light of the above teachings. It is therefore to be understood that within the scope of the appended claims, the invention may be practiced otherwise than as specifically described herein.

What is claimed is:

1. A flow control valve, comprising:

a fixed iron core, an electromagnetic coil, a casing made of a magnetic substance in which the electromagnetic coil is received, a movable iron core attractable to the fixed iron core so as to be moveable in a first direction, a return spring for urging the movable iron core in a second direction opposite the first direction, a casted flow control valve main body provided with a fluid inlet passage and a fluid outlet passage, a valve provided on the movable iron core, and a valve seat with which the valve is in contact in a nonelectric conductive state, wherein said main body is formed by casting a raw material in such a manner that at least one of the fluid inlet and outlet passages of the fluid control valve main body is dimensioned to restrict the maximum flow rate of the flow control valve.

2. The flow control valve according to claim 1, wherein at least one of the fluid inlet and outlet passages has an opening which is formed at the fitting surface of the flow control valve main body.

3. The flow control valve according to claim 1, wherein the valve is formed integrally with the movable iron core.

4. The flow control valve according to claim 1, wherein the valve is attached to the movable iron core so as to be operable in association with the same.

* * * * *